United States Patent
Sullivan et al.

[11] Patent Number: 5,859,812
[45] Date of Patent: Jan. 12, 1999

[54] SELF POWERED UNDERWATER ACOUSTIC ARRAY

[75] Inventors: Michael J. Sullivan, Oakdale; Douglas G. Dussault, East Lyme; Timothy P. Smith, Norwich; Thomas R. Stottlemyer, Mystic, all of Conn.

[73] Assignee: The United States of America as represented by the Secretary of the Navy, Washington, D.C.

[21] Appl. No.: 953,786

[22] Filed: Oct. 14, 1997

[51] Int. Cl.$^6$ ........................................................ G01S 3/86
[52] U.S. Cl. ............................................. 367/130; 114/253
[58] Field of Search .............................. 367/20, 153, 154, 367/130; 114/242, 253

[56] References Cited

U.S. PATENT DOCUMENTS

| | | | |
|---|---|---|---|
| 4,464,739 | 8/1984 | Moorcroft | 367/130 |
| 5,532,979 | 7/1996 | Hansen et al. | 367/130 |

Primary Examiner—Ian J. Lobo
Attorney, Agent, or Firm—Michael J. McGowan; Prithvi C. Lall; Michael F. Oglo

[57] ABSTRACT

A self-powered towed underwater sensor is provided. The sensor has a shielded casing which encloses an electric generator. The generator is connected to an impeller that is located at the midpoint of the casing. The impeller is covered by a shroud which minimizes the disturbance of the water by the impeller. The casing contains a shield which absorbs electromagnetic radiation produced by the generator. The shield is placed around the generator. A towed cable is connected to the forward end of the casing. The towed cable is made of a material having a high tensile strength to facilitate towing. A fiber optic cable is located within the towed cable and runs the length of the cable, specifically for transmission of received data from the attached sensor to the towing craft. The use of fiber optics prevents interference by electromagnetic radiation in the environment through which the cable passes, and there is no power lead that could conduct interference into the array.

8 Claims, 2 Drawing Sheets

SELF POWERED UNDERWATER ACOUSTIC ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to underwater acoustic detection devices and specifically to impeller driven electrical generators for self powered devices towed underwater.

(2) Description of the Prior Art

Towed acoustic receptor arrays have found a wide variety of uses throughout both the military and commercial sectors. In military uses, the U.S. Navy has used towed receptor arrays to distance the array from the "noise" of the towing ship. This separation allows the receptor arrays to operate at a higher level of sensitivity leading to earlier detection of hostile targets. In the commercial-sector, many operators have used towed arrays for exploration, notably in the fields of oil and gas exploration and salvage operations. In both these cases, the objective has been to boost the sensitivity of the towed array while distancing it from the towing craft so that the array operation is not affected by the movement of the towing craft. However, the use of the long tow cables has resulted in two major inherent drawbacks. First, the cable itself is subject to electromagnetic interference from a variety of sources, including other devices towed by the same tow cable. Additionally, power is provided for the remote devices from the towing ship. This means that each tow line must contain a copper power feed in addition to the data transmission leads. The drawbacks from this are numerous. The power feed is an additional source of electromagnetic interference for the closely situated data transmission leads. The length of the tow cable is usually of such magnitude that significant amounts of power (up to 50%) are dissipated during transferal of power from the towing ship to the end device. This dissipation requires that larger diameter cables be used to handle higher power levels, which increases the weight of the cable, increase the storage requirements and further complicates the electromagnetic problems already described.

In the prior art, attempts to solve these problems have focused on the data transmission side of the problem. Through the use of fiber optic transmission leads, prior art devices have succeeded in making the transmission media less susceptible to electromagnetic interference, both from the nearby power feed as well as from other, external sources around the tow cable. The use of fiber optic leads has also decreased the amount of copper wiring in the towed cable, thus beneficially decreasing the weight and diameter of the tow cable.

However, the power feed remains a significant problem not yet addressed by the prior art. No prior art devices have eliminated this "weak link" which provides the bulk of the electromagnetic interference and tow cable weight in the prior art.

SUMMARY OF THE INVENTION

Accordingly, it is an object of the present invention to provide a towed underwater acoustic array which generates needed power at the device, eliminating the need for a separate power feed.

A further object of the present invention is to provide fiber optic based transmission of acoustic array data.

A still further object of the present invention is to minimize the sources of electromagnetic interference and acoustic radiation which act upon the highly sensitive acoustic array by eliminating the power feed conductor which can conduct electromagnetic interference to the acoustic array.

A still further object of the present invention is to minimize the weight and diameter of the towed cable and acoustic array device.

In accordance with these and other objects, the invention is related to a towed acoustic array which has an impeller driven generator built into the head of the towed array. The generator is shielded to minimize the amount of electromagnetic interference which it emits, and the impeller is shrouded to minimize the degree of disturbance to the water by its movement. The generator provides all needed power for the towed array, thus the power needs are considerably diminished, and the copper power feed is not required in the tow cable. Data transmission is handled through fiber optic leads, and these leads are the only strands within the tow cable other than the strength carrying members in the tow cable. This system minimizes the weight and complexity of the tow cable while providing a robust, interference resistant acoustic receptor array.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
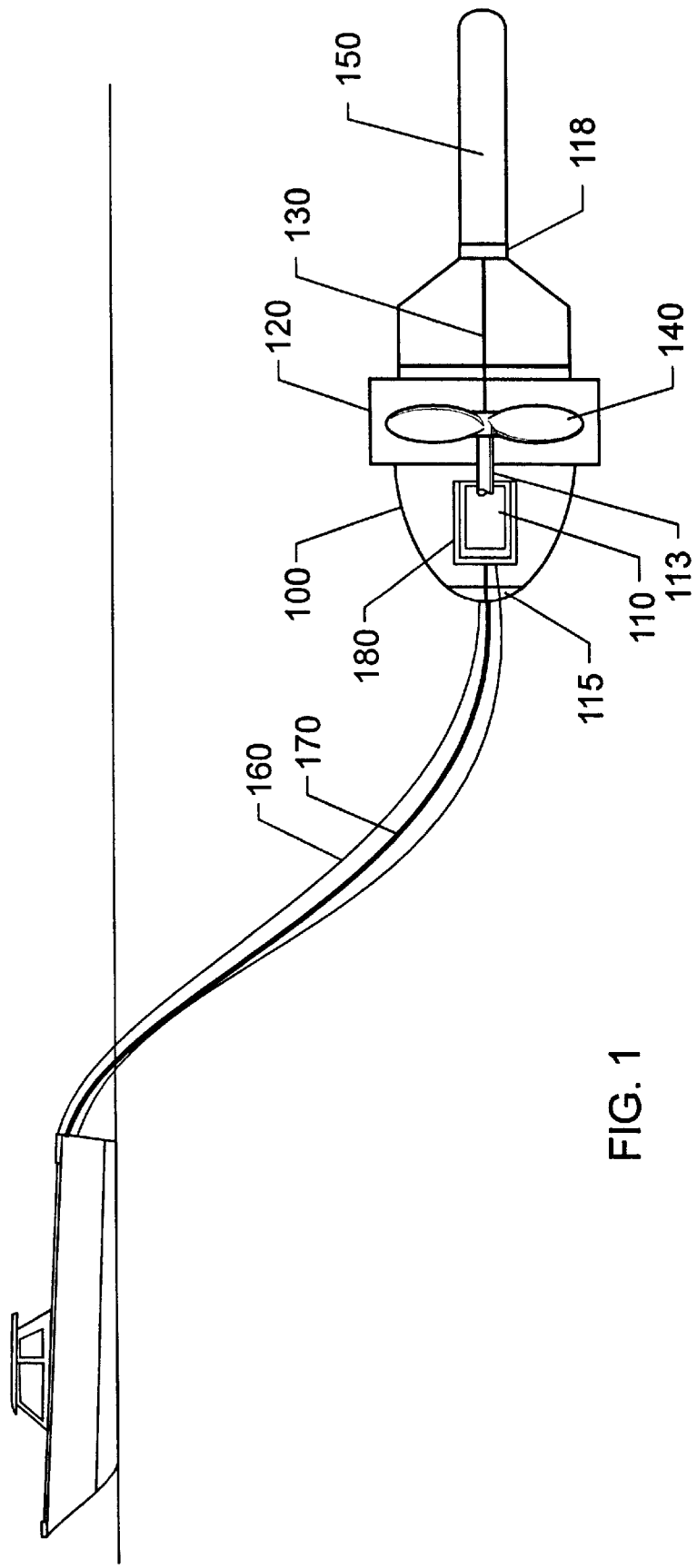
FIG. 1 is a block diagram of the complete towed array.

Referring now to the drawings, and in particular to FIG. 1, a block diagram of the complete towed array system is depicted. Towed cable 160 is connected to generator casing 100. Generator 110 is placed within generator casing 100. Generator 110 is connected by shaft 113 to impeller 140. Impeller 140 is placed in shroud 120. Shroud 120 is rigidly connected to generator casing 100. The design of shroud 120 is such that water is pushed through the shroud across the blades of impeller 140. After passing by impeller 140, the water is smoothly dispersed by shroud 120 back into the stream behind generator casing 100 such that disturbances in the water flow around acoustic sensor array 150 is minimized. Generator 110 is surrounded by an electromagnetic shield 180, fabricated with an electromagnetically shielding metal which absorbs a large percentage of the electromagnetic interference created by electric generator 110. Acoustic sensor array 150 is flexibly connected to generator casing 100. Feed channel 130 runs through the interior of generator casing 100 and carries both the electrical power line from generator 110 and the fiber optic output line from acoustic sensor array 150. Feed channel 130 is connected through sensor mounting bracket 118 to acoustic sensor array 150. The two lines are shielded within the channel. The electrical part of feed channel 130 connects directly to generator 110.

The fiber optic signal connects at the forward end of feed channel 130 to generator casing mounting bracket 115. Generator casing mounting bracket 115 is rigidly fixed within generator casing 100 and has an optical connection to fiber optic cable 170 inside towed cable 160. Both fiber optic cable 170 and towed cable 160 are designed for physical and optical connection to a towing craft.

Figure 2A:
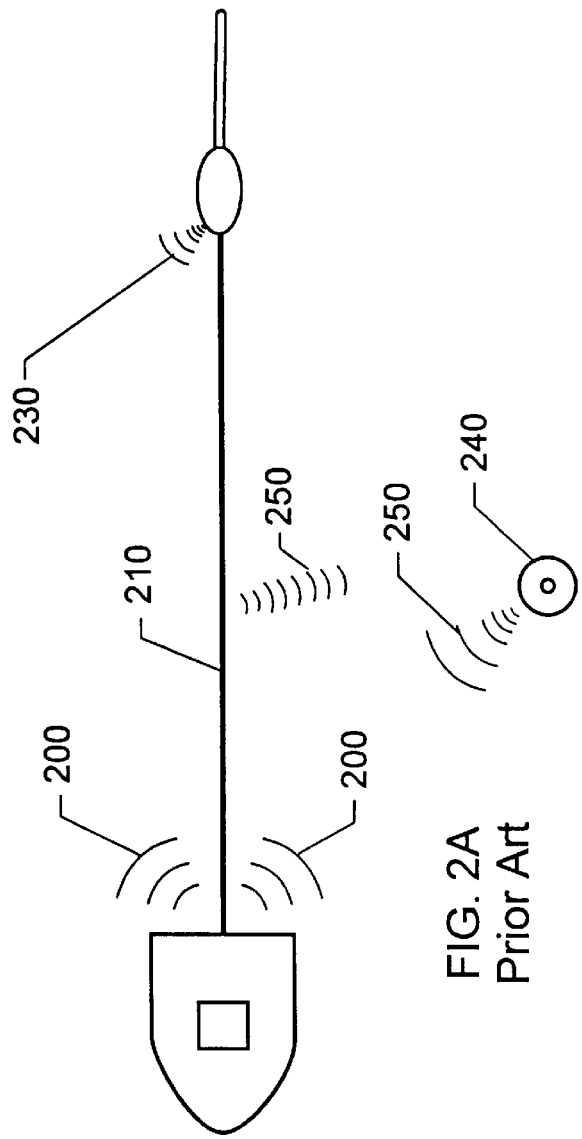
FIG. 2A is a diagram of the potential electromagnetic interference paths of the prior art devices.
Figure 2B:
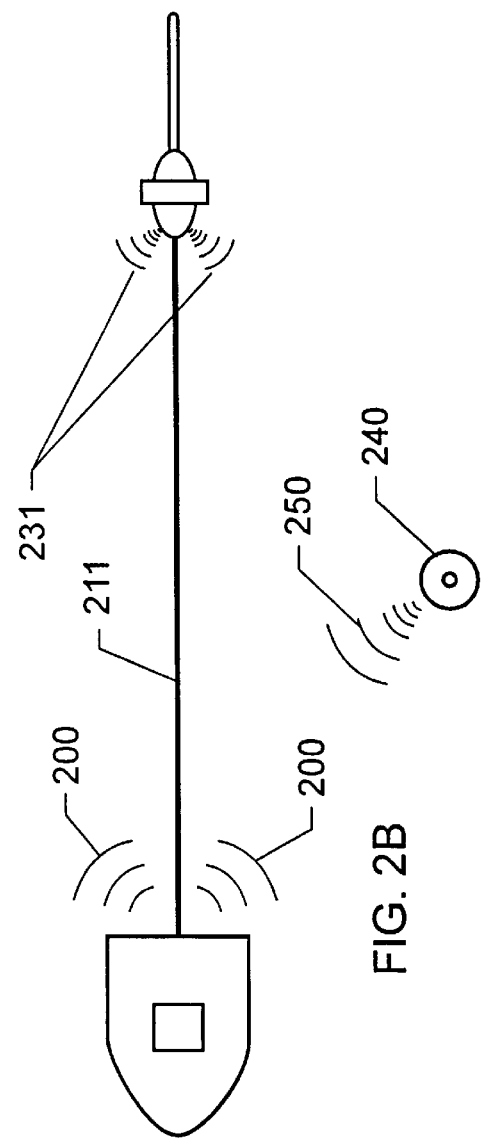
FIG. 2B is a diagram of the potential electromagnetic interference paths of the present invention.

Referring now to FIGS. 2A and 2B, depictions comparing the acoustic and electromagnetic interference patterns caused by both the prior art devices and present invention are shown. The first source of acoustic interference is the towing craft, which generates acoustic waves 200. This type of interference affects both the prior art and present invention. In general, the acoustic array is not used for forward detection of signals because of this type of interference.

The towed cable 210 is the next source of interference. In prior art devices as shown in FIG. 2A, towed cable 210 contains both the fiber optic data lead as well as a copper power feed line. The copper power feed line is susceptible to electromagnetic interference, and it also serves as a source of electromagnetic interference in its own right. As an example of this type of interference, consider external electromagnetic source 240 which emits electromagnetic radiation 250. In prior art devices, towed cable 210 absorbs electromagnetic radiation 250, which is communicated along the line to the remote device. The flow noise while decreasing array performance does not radiate.

By contrast, in the present invention as shown in FIG. 2B, the towed cable 211 does not contain the copper power feed line but contains only a shielded fiber optic link. As the shielded fiber optic link is relatively insensitive to electromagnetic interference, towed cable 211 is not affected by source 240.

The final source of interference is the electromagnetic radiation created in the local wiring of the towed array. In the prior art, as shown in FIG. 2A, the power cables leading to and within the towed arrays emit electromagnetic radiation 230. In the present invention, as shown in FIG. 2B, only the internal generator with a short wiring path emits any radiation. As a result, electromagnetic radiation 231 is greatly reduced. Further, since the generator and wiring are shielded within the towed array and no electromagnetic radiation is emitted by the tow cable, the amount of electromagnetic radiation is greatly reduced as compared to the devices of the prior art.

Through the use of the present invention, many of the key problems which the prior art has left outstanding are now solved. The benefits and advantages of the present invention are numerous. Specifically, the system allows for internal generation of electrical power for towed arrays, thus greatly decreasing both the amount of electromagnetic radiation given off by the system as a whole as well as the susceptibility of the system to absorption and transmission of external electromagnetic radiation. Further, the present invention also eliminates the requirement for solid copper wiring within the tow cable, thus greatly decreasing the weight, diameter and cost of the tow cable. Additionally, the elimination of copper wiring within the towed cable greatly diminishes the effect of ambient radiated and conducted interference on the entire array. Further, the present invention also utilizes a fiber optic feed system to maintain integrity of data being reported from the remote sensors to the towing craft.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A towed underwater sensor device comprising:
    a means for towing an acoustic sensor array, including a fiber optic data link without a power conductor;
    a generator casing attached to said towing means;
    a generator displaced within said generator casing;
    a shroud rigidly attached to said generator casing;
    an impeller rigidly attached to said generator and displaced within said shroud; and
    an acoustic sensor array flexibly attached to said generator casing.

2. A towed underwater sensor device as in claim 1 wherein said towing means further comprises a towed cable and a fiber optic cable, said fiber optic cable being displaced within said towed cable.

3. A towed underwater sensor device as in claim 2 wherein said fiber optic cable is shielded with electromagnetically inert material to reduce electromagnetic interference to the array.

4. A towed underwater sensor device as in claim 1 wherein said generator casing further comprises a generator casing mounting bracket rigidly attached to one end of said generator casing and a sensor mounting bracket rigidly attached to the opposing end of said generator casing.

5. A towed underwater sensor device as in claim 4 wherein said generator casing further comprises a feed channel having two ends, placed within said generator casing and running the length of said generator casing, the two ends being physically, optically and electronically connected to said generator casing mounting bracket and said sensor mounting bracket.

6. A towed underwater sensor device as in claim 1 wherein said generator casing further comprises a shield surrounding said generator.

7. A towed underwater sensor device as in claim 1 wherein said generator shield is fabricated with an electromagnetic shielding metal.

8. A towed underwater sensor device comprising:
    a towed cable;
    a fiber optic cable displaced within and running the length of said towed cable;
    a generator casing having an aft end connected to said towed cable;
    a generator casing mounting bracket rigidly affixed to the forward end of said generator casing, physically connected to said towed cable, and optically connected to said fiber optic cable;
    a sensor mounting bracket rigidly affixed to the aft end of said generator casing;
    a shroud rigidly attached to said generator casing between said generator casing mounting bracket and said sensor mounting bracket;
    an impeller displaced within said shroud;
    an electric generator rigidly attached to said impeller and placed within said generator casing;
    a feed channel displaced within said generator casing and running the length of said generator casing between said generator casing mounting bracket and said sensor mounting bracket;
    a power line displaced within said feed channel and electronically connected to said generator and said sensor mounting bracket;

a fiber optic output line placed within said feed channel and optically connected to said generator casing mounting bracket and said sensor mounting bracket;

a shield around said generator; and an acoustic sensor array physically and electronically attached to said sensor mounting bracket.

* * * * *